June 15, 1965  D. H. BAKER ETAL  3,188,749
FLUX VALVE COMPENSATOR

Filed Aug. 10, 1962  2 Sheets-Sheet 1

INVENTORS
DONALD H. BAKER
JOHN W. COLTON
DONALD R. KUELBS

BY S.C.Yeaton
ATTORNEY

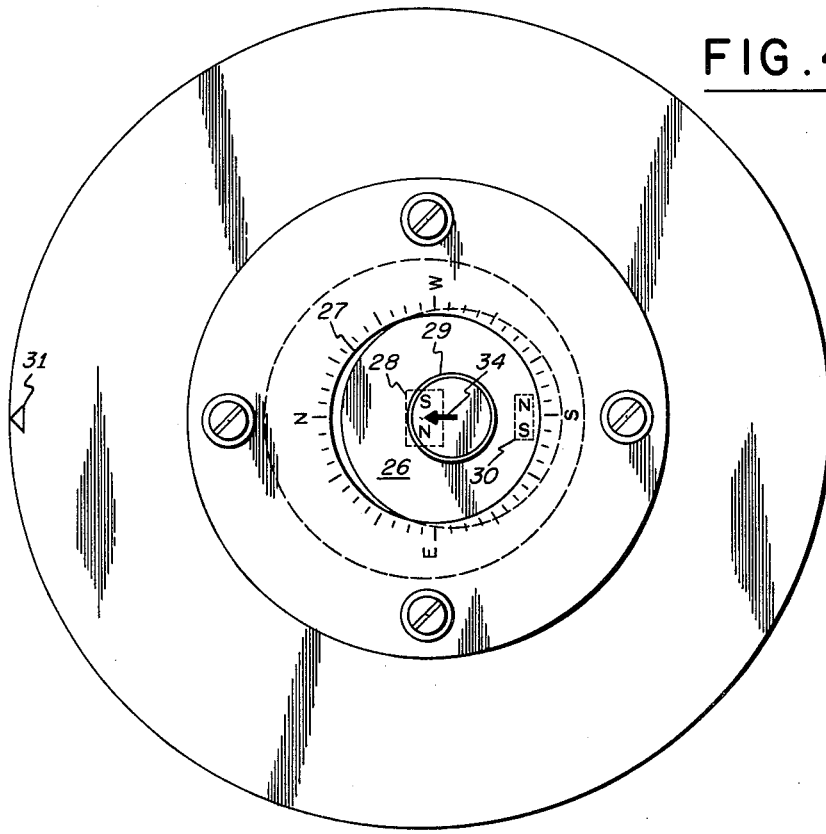
FIG.4.
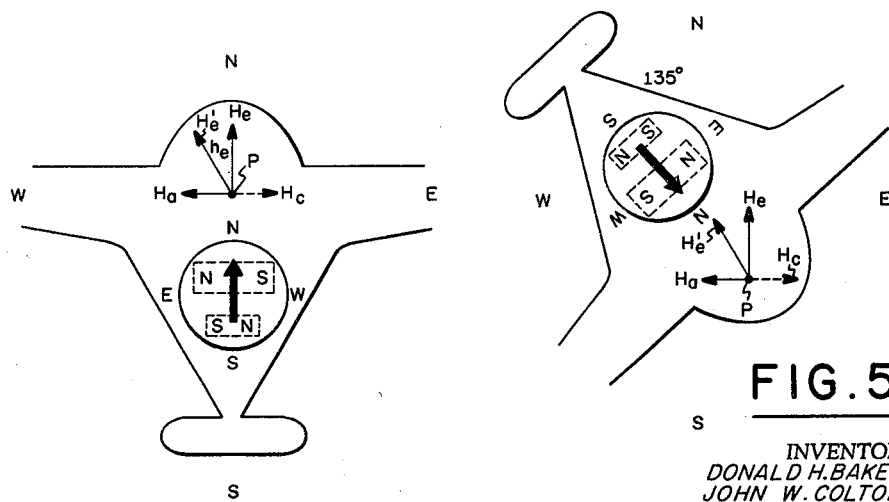
FIG.5A.
FIG.5B.
INVENTORS
DONALD H. BAKER
JOHN W. COLTON
DONALD R. KUELBS

United States Patent Office 3,188,749
Patented June 15, 1965

3,188,749
FLUX VALVE COMPENSATOR
Donald H. Baker, Phoenix, Ariz., John W. Colton, Santa Barbara, Calif., and Donald R. Kuelbs, Phoenix, Ariz., assignors to Sperry Rand Corporation, Great Neck, N.Y., a corporation of Delaware
Filed Aug. 10, 1962, Ser. No. 216,255
11 Claims. (Cl. 33—224)

This invention relates in general to apparatus for producing a magnetic field having a variable direction and magnitude. In particular, the invention relates to apparatus that may be used to cancel the adverse effect of a local magnetic field near a device adapted to sense the magnetic field of the earth, e.g. the flux valve compass shown and described in U.S. Patent 2,357,319, issued in the names of Esval and Frische and assigned to the present assignee.

As is known, when a compass or other device for sensing the magnetic field of the earth is situated in a vehicle that is swung through 360° in a plane parallel to the surface of the earth, a local resultant field caused by permanent magnetization of parts of the vehicle causes the compass to have a directional error that reaches two maximums, one in which the compass reads too many degrees and one in which the compass reads too few degrees: hence, a one cycle heading deviation error. To cancel such one cycle error, a compensating field (being equal in magnitude but opposite in direction to the local field within the vehicle) is produced near the compass, thereby causing the resultant sensed field to be always parallel to the field of the earth. Two such devices for producing compensating fields are shown and described in U.S. Patents 2,593,070 and 2,238,867, the latter being assigned to the present assignee. Such prior art compensating apparatus require precision gearing and matched calibrated magnets and, as such, are expensive to manufacture. The present invention, on the other hand, provides equivalent compensation simply by means of two specially aligned magnets and a permeable shield, the field of one magnet being substantially stronger than the field of the other and both magnets being positionable simultaneously with respect to the shield.

The principal object of the invention is to provide a device for producing a magnetic field of adjustable strength and direction.

Another object of the invention is to provide apparatus for compensating for the permanent magnetization of magnetic material in the vicinity of a compass or other device adapted to sense the magnetic field of the earth.

Another object of the invention is to provide apparatus that cancels the adverse effect of a local field near a compass or other device adapted to sense the magnetic field of the earth which does not require a plurality of calibrated magnets and precision gearing therebetween.

The invention will be described with reference to the figures wherein:

FIG. 4 is a top view of the flux valve compass of FIG. 3, and FIGS. 5A and 5B are diagrams useful in showing how the invention may be employed to compensate for one cycle error in aircraft.

The principle upon which apparatus embodying the invention operates will be described with reference to FIG. 1 which diagrammatically shows how a magnetic field of variable strength and direction is produced. In the situation depicted by I, a field at a point P is provided by two cooperating magnets 10 and 12 and a permeable shield 14, such field having a direction into the page and having a particular maximum strength. The permeable shield 14 prevents most, e.g. 80%, of the field produced by the magnet 12 from reaching the point P (i.e. at best, 20% of the field ordinarily produced at the point P by a magnet positioned for maximum shielding will always reach that point), whereas a considable part of the field produced by the unshielded magnet 10 reaches the point P. The magnets 10 and 12 are so positioned that their respective fields are opposite in direction to each other, the strength of the magnet 12 being such that when it is unshielded (as shown by II), its field at the point P is at least as strong as the field produced at that point by the magnet 10 when the magnet 10 is positioned for maximum shielding, i.e. in the example given the magnet 12 is about 20% as strong as the magnet 10. If the magnets 10 and 12 are slid across the shield 14 to occupy the positions shown by II, the field at the point P reduces to zero, this being impossible without the magnet 12 since, as mentioned above, the point P can never be completely shielded from the magnet 10, i.e. the field of the unshielded magnet 12 at the point P exactly cancels the field of the shielded magnet 10 at that point. The situation depicted by III shows that the direction of the compensation field may be changed to come out of the page by reversing the directions of the magnet fields as shown by I.

The range within which the field at the point P may vary is substantially unaffected by the use of the magnet 12 (the field of which is always counter to the resultant compensation field at the point P) for the following reason: when the magnets 10 and 12 are positioned as shown by II, i.e. no field appears at the point P, and then repositioned as shown by I, the field of the magnet 12 at the point P gradually reduces to 20% of its effectiveness in countering the field of the magnet 10 at that point; since the magnet 12 is already only 20% as strong as the magnet 10, the effect of the magnet 12 (when positioned as shown by II), is to reduce the maximum field (that would be possible without its use) by only 4%; however, as noted above, the magnet 12 permits the resultant field at the point P to be reduced to zero.

Figure 1:
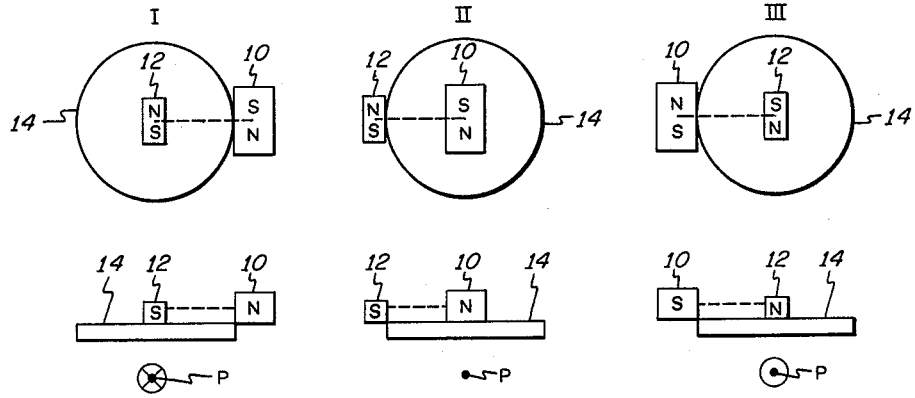
FIGS. 1 and 2 are diagrams useful in describing the invention.
Figure 2:
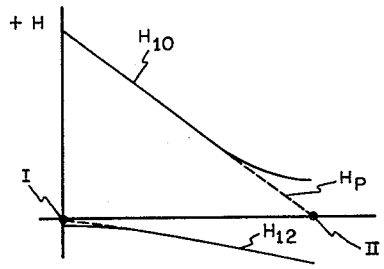

FIG. 2 shows how the field strengths $H_{10}$ and $H_{12}$ of the individual magnets 10 and 12 at the point P respectively vary as the magnets are changed in position from I to II of FIG. 1, i.e. "I" and "II" are limits on the abscissa of the graph of FIG. 2 within which the fields $H_{10}$ and $H_{12}$ vary. As shown, the $H_{12}$ field at I is essentially non-existent whereas the field $H_{10}$ is maximum; at II, the $H_{12}$ field peaks to counter the "unshielded" part of the magnet 10 field, thereby causing the resultant field $H_p$ to vary linearily between its limits from zero to a maximum.

Figure 3:
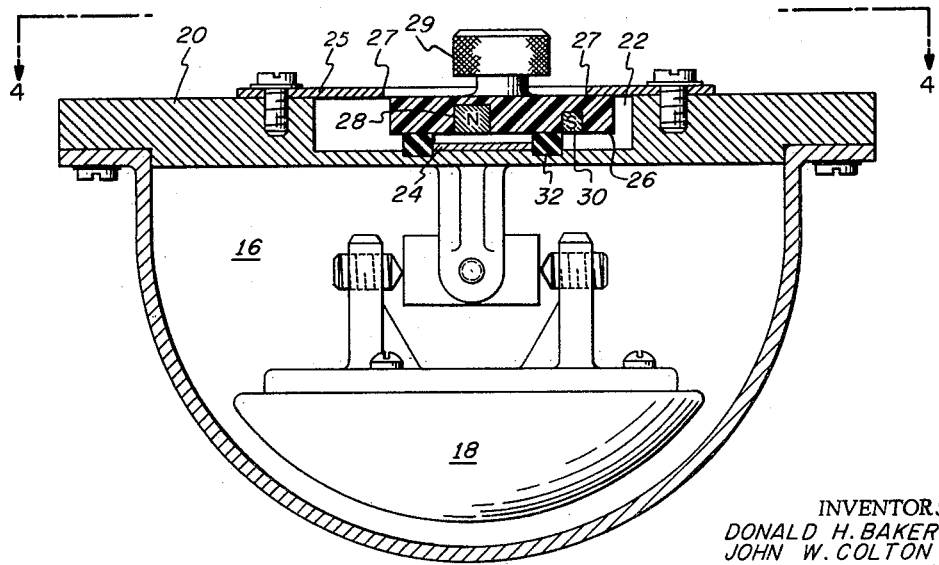
FIG. 3 is a side sectional view of a flux valve compass incorporating the present invention.

In FIG. 3, a flux valve compass 16 having a pendulously suspended magnetic field sensing element 18 has a compensator 20 embodying the invention secured to it by suitable means. The flux valve compass may, for example, be of the type shown and described in the aforementioned U.S. Patent 2,357,319 and be adapted for installation in an aircraft (or other vehicle) in a location remote as possible from permanently magnetized parts of the craft, a typical remote location being far out on one wing. The compensator 20 has a recess 22 into which a permeable shield 24 is fixedly positioned. A non-permeable disc 26 containing two counter-oriented magnets 28 and 30 is positionable in a plane parallel to the permeable shield 24 within the recess 22 by a knob 29, such knob being movable within a cutout 27 in a cover 25 for the compensator 20. The size of the cutout 27 is smaller than the disc 26 and, therefore, the disc 26 is restrained to translational and rotational movement within the recess 22. A rubber ring 32 urges the disc 26 against the cover 25 so that, once the disc 26 is positioned, frictional forces keep it in place. FIG. 4 shows the general appearance of the flux valve compass 16 (looking down on it) with the compensator 20 attached, the magnets 28 and 30 being shown in dashed lines to show their relative orientations with respect to an arrow 34 atop the knob 29, i.e. the arrow 34 is directed perpendicular to the fields produced by the magnets 28 and 30. To be noted is the fact that the compensator 20 has heading indicia displaced about the edge of the cutout 27, "N-E-W-S" being as shown for a reason that will become apparent as a result of the discussion relating to FIGS. 5A and 5B. An index 31 is provided on the compensator and is adapted to be pointed in the direction of the earth's field, the compass itself also having such a reference.

To utilize the compensator in conjunction with a flux valve compass installed in an aircraft, the craft is swung on a compass rose through 360° of heading and the point at which the one cycle heading error peaks is noted. Such swinging of an aircraft to compensate for compass errors is fully described in U.S. Patent 2,887,872, issued in the name of W. Halpern et al., and assigned to the present assignee. The craft is then headed in the direction noted and the arrow 34 on the compensator knob is rotated from its neutral positon, i.e. at N, to the compensator indicia representing the heading at which the heading error peaked. Then, the knob 29 is slid in the direction of the arrow until such error becomes cancelled.

To see how the above operation performs the desired compensation, reference sould be had to FIGS. 5A and 5B which show two "compensation" examples, respectively one in which the heading error peaks at a due north heading and one in which the error peaks at a heading of 135°. In each of these figures, the manner of orienting the compensator field is alone sought to be taught and, to facilitate this teaching, the compensator is deliberately shown incomplete (but understandably so) and mispositioned in the craft.

In FIG. 5A, the craft local field $H_a$ is shown perpendicular to the magnetic field of the earth $H_e$ when the craft heads due north, thereby causing (in the absence of compensation) a heading error $h_e$ to be maximum when the craft is at that heading, i.e. the compass senses the direction of the magnetic vector $H_e'$ instead of the direction of the vector $H_e$ when the craft heads due north. To make the compass sense the $H_e$ direction alone, the compensating field $H_c$ is provided. With the knob 29 so positioned that the arrow 34 points to N, a magnetic field having the direction of $H_c$ is produced; by moving the knob 29 in the direction of the arrow, the strength of this field is varied to equal the craft field $H_a$, thereby causing the compass to read properly. In the situation (FIG. 5B) where the heading error peaks when the craft has a heading of 135°, i.e. the craft local field $H_a$ is perpendicular to the magnetic field of the earth $H_e$ when the craft heading is 135°, the compensator arrow 34 is rotated counterclockwise to alignment with the indicia "135," thereby causing the compensator field $H_c$ to be opposite in direction to the direction of the craft local field $H_a$. By again sliding the knob 29 in the direction of its arrow 34 until $H_c$ equals $H_a$, the compass will be made to read properly.

Whereas the invention has been described in only one form, it is to be realized that many other forms are also possible and practical: for example, the compensator may be displaced to one side of the compass instead of being centrally positioned as shown; also, while the shield 24 is shown between the sensing element 18 and the compensating magnets 28 and 30, this need not be so since the shield at best functions to redirect only some magnetic flux; further, once the direction of the compensation field is determined and the magnets appropriately oriented, shielding material may be inserted between the compensator and the compass to vary the strength of the compensation field (instead of moving magnets relative to a fixed shield). While the compensator 20 is described as a separate item to be installed atop a flux valve compass, this need not be so either since the compensator may be made as an integral part of the flux valve itself.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for producing at a point in space a magnetic field having a variable strength and direction comprising means producing a first magnetic field having a particular direction, means providing variable shielding of said first magnetic field from said point, said variable shield means being capable of substantially completely shielding said point, means producing a second magnetic field having a direction which is always counter to the direction of said first field, said second magnetic field being weaker than the first magnetic field and being at least equal in strength to the part of said first magnetic field that cannot be shielded from said point, and means for simultaneously varying the direction of said first and second fields.

2. Apparatus for varying the strength and direction of a magnetic field at a point in space comprising first and second magnetic field producing means each of which produces a field that has a direction substantially opposite to the direction of the other, the respective axes of said fields being displaced by a predetermined amount, permeable means in the vicinity of said first field producing means, means for providing relative movement between said permeable means and said first and second field producing means, whereby the field of said first field producing means at said point in space may be reduced to some predetermined level, said second field producing means producing a field that is less than the field of said first field producing means but greater than said predetermined level, and means operable with both said field producing means to rotate the axes of their respective fields.

3. Apparatus for producing a magnetic field at a point in space of variable strength and direction comprising first and second magnets the axes of which are spacially set apart and the fields of which are in opposite directions, permeable shield means in a plane between said magnets and said point, means for providing relative movement between said magnets and said shield whereby the field at said point produced by said first magnet may be reduced to a predetermined level, said second magnet having a strength which is sufficient to produce at said point a field which is at least equal to said predetermined level when the field of said first magnet at that point is at said predetermined level, and means for rotating the axes of said magnets to change the direction of their fields at said point.

4. In combination with a sensor adapted to sense the magnetic field of the earth, apparatus for cancelling the effect of permanently magnetized material near said sensor by producing at said sensor a magnetic field equal and counter to the direction of the field there caused by said permanently magnetized material, comprising means producing a first magnetic field having a particular direction, means providing variable shielding of said first magnetic field from said sensor, said variable shield means being capable of substantially completely shielding said sensor, means producing a second magnetic field having a direction which is always counter to the direction of said first field, said second magnetic field being weaker than said first magnetic field and being at least equal in strength to the part of said first magnetic field that cannot be shielded from said sensor, and means for simultaneously varying the direction of said first and second fields.

5. In combination with a sensor adapted to sense the magnetic field of the earth, apparatus for cancelling the effect of permanently magnetized material near said sensor by producing at said sensor a magnetic field equal and counter to the direction of the field there caused by said permanently magnetized material, comprising first and second magnetic field producing means each of which produces a field that has a direction substantially opposite to the direction of the other, the respective axes of said fields being displaced by a predetermined amount, permeable means in the vicinity of said first field producing means, means for providing relative movement between said permeable means and said first and second field producing means, whereby the field of said first field producing means at said sensor may be reduced to some predetermined level, said second field producing means producing a field that is less than the field of said first field producing means but greater than said predetermined level, and means operable with both said field producing means to rotate the axes of their respective fields.

6. In combination with a sensor adapted to sense the magnetic field of the earth, apparatus for cancelling the effect of permanently magnetized material near said sensor by producing at said sensor a magnetic field equal and counter to the direction of the field there caused by said permanently magnetized material, comprising first and second magnets the axes of which are spacially set apart and the fields of which are in opposite directions, permeable shield means in a plane between said magnets and said sensor, means for providing relative movement between said magnets and said shield whereby the field at said sensor produced by said first magnet may be reduced to a predetermined level, said second magnet being weaker than said first magnet and having a strength which is sufficient to produce at said sensor a field which is at least equal to said predetermined level when the field of said first magnet at that point is at said predetermined level, and means for rotating the axes of said magnets to change the direction of their fields at said sensor.

7. Apparatus for cancelling the adverse effect of permanently magnetized material near a sensor adapted to sense the magnetic field of the earth by producing at said sensor a local field which is equal and opposite to a field there caused by said magnetized material comprising means producing a first magnetic field having a particular direction, means providing variable shielding of said first magnetic field from said sensor, said variable shield means being capable of substantially completely shielding said sensor, means producing a second magnetic field having a direction which is always counter to the direction of said first field, said second magnetic field being weaker than said first magnetic field and being at least equal in strength to the part of said first magnetic field that cannot be shielded from said sensor, and means for simultaneously varying the direction of said first and second fields.

8. Apparatus for cancelling the adverse effect of permanently magnetized material near a sensor adapted to sense the magnetic field of the earth by producing at said sensor a local field which is equal and opposite to a field there caused by said magnetized material comprising first and second magnetic field producing means each of which produces a field that has a direction substantially opposite to the direction of the other, the respective axes of said fields being displaced by a predetermined amount, permeable means in the vicinity of said first field producing means, means for providing relative movement between said permeable means and said first and second field producing means, whereby the field of said first field producing means at said sensor may be reduced to some predetermined level, said second field producing means producing a field that is less than the field of said first producing means but greater than said predetermined level, and means operable with both said field producing means to rotate the axes of their respective fields.

9. Apparatus for cancelling the adverse effect of permanently magnetized material near a sensor adapted to sense the magnetic field of the earth by producing at said sensor a local field which is equal and opposite to a field there caused by said magnetized material comprising first and second magnets the axes of which are spacially set apart and the fields of which are in opposite directions, permeable shield means in a plane between said magnets and said sensor, means for providing relative movement between said magnets and said shield whereby the field at said sensor produced by said first magnet may be reduced to a predetermined level, said second magnet being weaker than said first magnet and having a strength which is sufficient to produce at said sensor a field which is at least equal to said predetermined level when the field of said first magnet at that point is at said predetermined level, and means for rotating the axes of said magnets to change the direction of their fields at said sensor.

10. A compensator adapted to be secured to a flux valve compass to cancel substantially one cycle heading deviation error thereof comprising housing means having a recess therein, permeable shield means secured within said housing recess, two magnets, and means positionable within said recess fixedly holding said magnets in spaced apart relationship with the axes of their respective fields parallel, said shield means being positioned between said means holding said magnets and a compass when said compensator is secured to a compass, said magnets having their fields oriented in substantially opposite directions and being of different strengths, the weaker magnet producing a field at a compass to which said compensator is secured which is at least as strong as the field there produced by the stronger magnet when the stronger magnet is positioned for maximum shielding from the compass.

11. A compensator adapted to be secured to a flux valve compass to cancel substantially one cycle heading deviation error thereof comprising housing means having a recess therein, permeable shield means secured within said housing recess, two magnets, and means positionable within said recess fixedly holding said magnets in spaced apart relationship with the axes of their respectively fields parallel, said shield means being positioned between said means holding said magnets and a compass when said compensator is secured to a compass, said magnets having their fields oriented in substantially opposite directions and being of different strengths, the weaker magnet producing a field at a compass to which said compensator is secured which is at least as strong as the field there produced by the stronger magnet when the stronger magnet is positioned for maximum shielding from the compass, and means for indicating the direction of orientation of said magnet fields, whereby the axes of those fields may be aligned perpendicular to the direction at which a one cycle error is maximum to cancel such error.

References Cited by the Examiner

UNITED STATES PATENTS

| | | | |
|---|---|---|---|
| 1,881,207 | 10/32 | Martin | 33—225 |
| 1,922,864 | 8/33 | Rhea | 33—225 |
| 2,011,775 | 8/35 | Reichel et al. | 33—225 |
| 2,177,218 | 10/39 | Klein et al. | 33—225 X |

FOREIGN PATENTS 205,339  10/23  Great Britain.

ISAAC LISANN, *Primary Examiner.*